Dec. 25, 1934. H. A. W. WOOD Re. 19,408

FOLDER PROTECTING DEVICE

Original Filed May 1. 1929 2 Sheets-Sheet 1

Inventor
Henry A. Wise Wood,
By attorneys
Coulter, Hall & Hanley

Witness
C. F. Nunn

Dec. 25, 1934. H. A. W. WOOD Re. 19,408

FOLDER PROTECTING DEVICE

Original Filed May 1, 1929 2 Sheets-Sheet 2

Inventor
Henry A. Wise Wood
By attorneys
Southgate Fay & Hardy

Witness
E. F. Mason

Reissued Dec. 25, 1934

Re. 19,408

UNITED STATES PATENT OFFICE 19,408

FOLDER PROTECTING DEVICE

Henry A. Wise Wood, New York, N. Y., assignor to Wood Newspaper Machinery Corporation, New York, N. Y., a corporation of Virginia Original No. 1,951,590, dated March 20, 1934, Serial No. 359,566, May 1, 1929. Application for reissue August 23, 1934, Serial No. 741,186

13 Claims. (Cl. 192—127)

This invention relates to a device for protecting the parts of a folder for papers and other sheet material against damage when the sheets wrap around the rolls or cylinders of the folder.

The principal objects of the invention are to provide means whereby the accumulation of sheet material on the cylinders or rollers of the folding machine will be prevented from causing damage by automatically stopping the machine and to provide this mechanism in a simple and inexpensive form which is sure to work when the emergency arises.

Other objects and advantages of the invention will appear hereinafter.

Reference is to be had to the accompanying drawings, in which

It is well known that when the paper, particularly in a newspaper folding machine, winds up on one of the cylinders or rolls it will engage the opposite cylinder or roll of the pair and is liable to cause damage by straining the parts. This invention is designed to avoid such action.

The folding machine is usually operated by electrical means which is provided with a stop circuit 10 which, when connected so as to allow the current to pass through it, will shut off the electric current from the motor which operates the machine and stop it, advantage of which is taken to accomplish the purpose of this invention.

Figure 1:
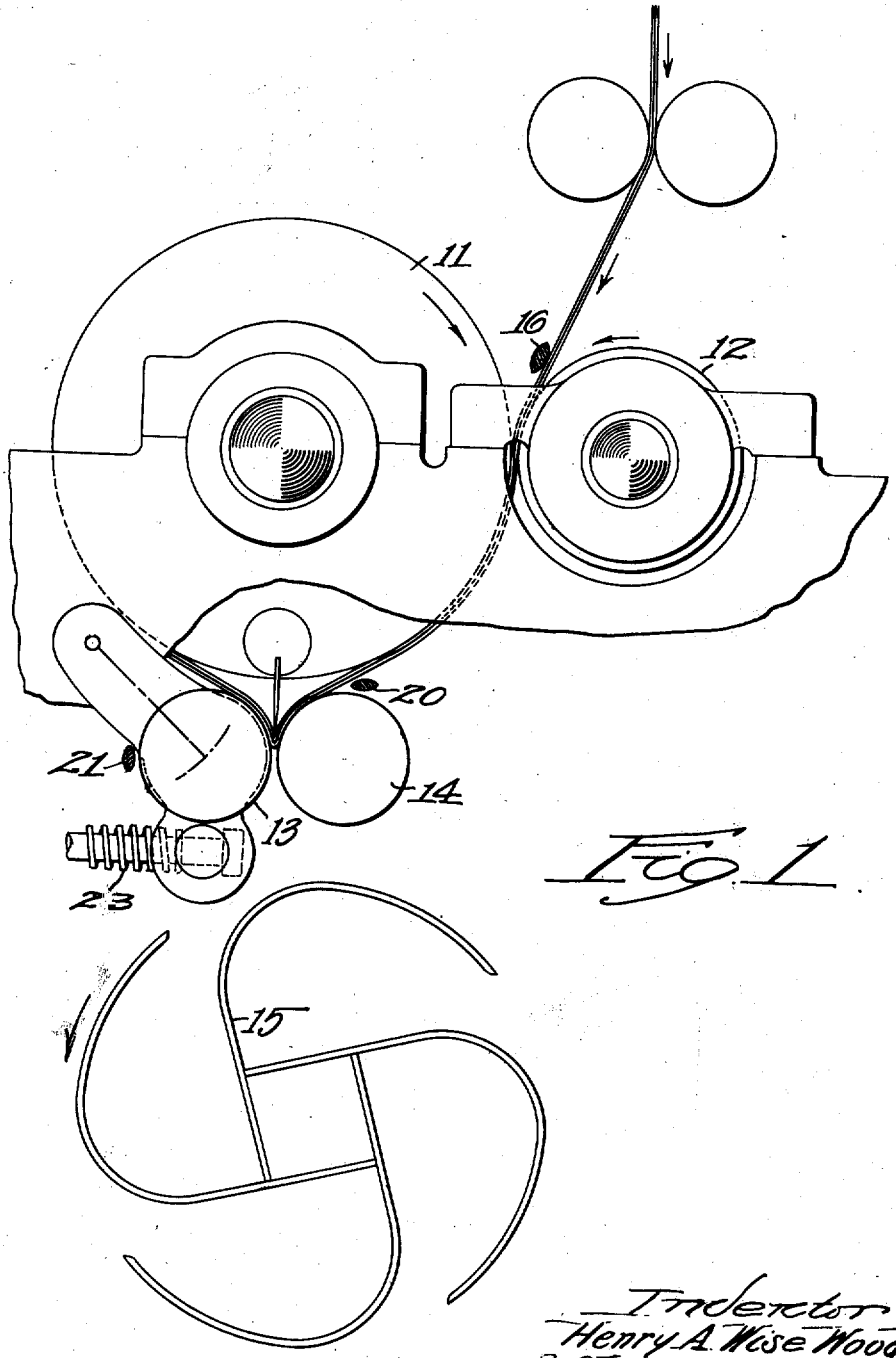
Fig. 1 is an end view of a part of a folding machine showing operating means for stopping the folder in emergency section.

I have shown the invention as applied to a folding machine comprising a folding cylinder 11, cutting cylinder 12 and two folding rolls 13 and 14 illustrated as in their usual relation to each other. The web of paper comes down through in the usual way, as illustrated in Fig. 1, and is delivered by the folding rolls to the fan delivery 15. The cylinders 11 and 12 constitute the folding couple.

Figure 2:
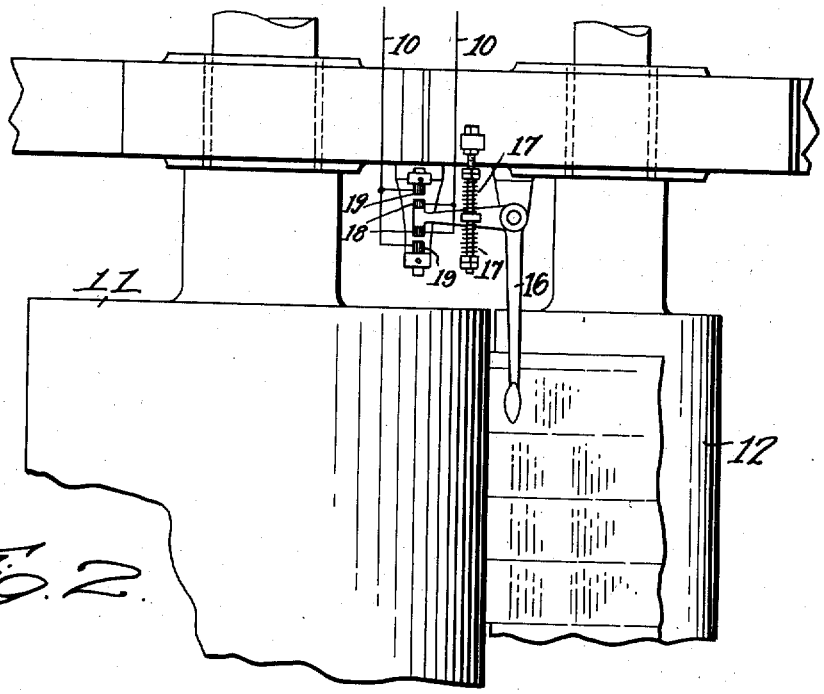
Fig. 2 is a plan thereof.
Figure 3:
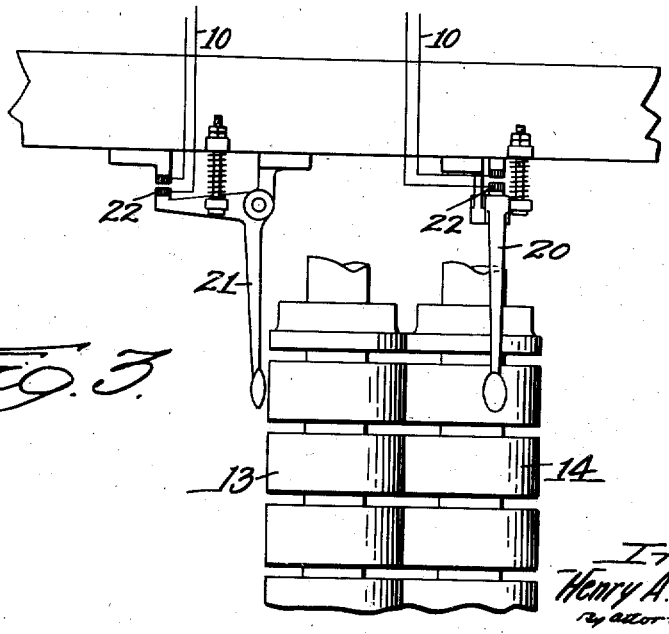
Fig. 3 is a plan of the invention as applied to the folding rolls.

Referring to Figs. 1 and 2 I have provided an emergency lever 16 shown as of the bell crank type and kept in neutral position by springs 17. On one arm of the bell crank are double contacts 18 which, when the lever is turned in either direction, will make a contact with either one of a pair of conducting pieces 19 which will complete one of the breaks across the circuit 10 and connect up a circuit so as to stop this pair of cylinders. This lever 16 is located adjacent to the running web and at a point practically between the two cylinders 11 and 12.

Now, if the web of paper does not go through the folding action but accumulates or piles up or increases in bulk on the cylinder 12 behind the moving web, it will force this lever over to the left in Fig. 1 and cause the machine to stop. Also if the paper should for any reason accumulate, or pile up or increase in bulk in the space between the running web and the cylinder 11, the web will engage this lever and cause it to move in the other direction and have the same effect.

In Figs. 1 and 2 I have shown the same idea as applied to the folding rolls 13 and 14. Here two levers 20 and 21 are located adjacent to the surfaces of these two folding rolls. Obviously if the paper accumulates or jams or bunches between these rollers or increase in bulk on either of these rolls it will actuate the lever 20 or 21 as the case may be. These levers are provided with contacts 22 and they are spring-pressed and when the paper winds up on either roll the corresponding lever will be moved to close its contact. This will complete the circuit 10 and stop the machine in either case.

The lever 21 acts a little different from the other because the roll 13 is pressed toward the roll 14 by a spring 23 and in this case the lever may be operated either by the paper wrapped around this roll or by the motion of this roll back against the spring 23 due to the thickness of the paper between the two rolls even if it is wound on the opposite roll. In either case the lever 21 will be operated to stop the machine.

This constitutes a very simple way of avoiding damage likely to happen when the paper accumulates on any one of the cylinders or rolls of the folding machine. It is inexpensive to install and has very few elements to keep in order. It is always in readiness for operation and there is no danger of accidental operation.

Although I have illustrated and described only two forms of the invention I am aware of the fact that other modifications can be made therein by any person skilled in the art without departing from the scope of the invention as expressed in the claims. Therefore, I do not wish to be limited in this respect but what I do claim is:—

1. In a folding machine, the combination with folding and cutting cylinders, of an emergency member mounted adjacent to said cylinders, said member being movable and having an electric contact adapted to be closed by its movement due to an accumulation of paper on either of said cylinders and a stop circuit in which said contact is located, arranged to stop the folding machine upon movement of the lever.

2. The combination with a folding couple, comprising a pair of cylinders, of a movable element located at a point adjacent to both cylinders thereof and in a position to be moved by any accumulation of paper on either of the cylinders, stop circuits, a pair of contacts in said stop circuits, a pair of contacts adapted to be moved by the movement of said movable element to close either of said circuits according to the direction of motion thereof, and means connected with said stop circuits to stop the rotation of said cylinders.

3. In a folding machine, the combination with cutting and folding cylinders and a pair of folding rolls, one being movable, of a lever located adjacent to the surface of said movable rolls, whereby upon accumulation of paper the roll and lever will be caused to move by the accumulation of paper, a stop circuit for stopping the folding couple and a contact in the stop circuit arranged to be closed by the motion of said lever, whereby the cylinders will be stopped.

4. In a folding machine, the combination with a folding couple, a pair of folding rolls, one of which rolls is movable, a lever located adjacent to the surface of one of said rolls, yielding means for pressing that roll toward the other, a stop circuit for stopping the rolls and a contact operated by said lever for closing the stop circuit when the paper accumulates on either of said rolls and pushes the movable roll away from the other.

5. In a folder, the combination with a pair of folding rolls, of a lever located adjacent to the surface of one roll and on the side thereof opposite the other roll, a stop circuit, an open contact in said circuit located on said lever, whereby the motion of said lever due to accumulation of paper on the roll and the movement of the roll against the lever will close the stop circuit and stop the machine, and yielding means for holding the lever in position for keeping the contact open.

6. In a folding machine, the combination with folding and cutting cylinders, of an emergency member mounted adjacent to one of said cylinders, said member being movable and having an electric contact adapted to be closed by its movement due to an accumulation of paper on one of said cylinders, a stop circuit in which said contact is located arranged to stop the folding machine upon such motion of the lever and yielding means for holding said movable member in neutral position to keep said contact open.

7. In a folding machine, the combination with cutting and folding cylinders, of a lever located adjacent to the surface of a web passing between said cylinders whereby an accumulation of paper on one cylinder will move the web against the lever, a stop circuit for stopping the folding couple and a contact in the stop circuit arranged to be closed by the motion of said lever, whereby the cylinders will be stopped.

8. In a folder, the combination with a pair of folding rolls for receiving a web between them, of a lever located adjacent to the surface of one roll between the roll and the web and on the side of that roll opposite the other roll, a stop circuit, open contacts in the circuit, one of said contacts being located on said lever, whereby the motion of the web due to accumulation of paper will move the web and close the stop circuit and stop the folder.

9. In a folder, the combination with a pair of folding rolls, of two levers, one located adjacent to the surface of each roll and on the sides of said rolls opposite the bight, two stop circuits, open contacts in each circuit, one of said contacts in each case being located on one of said levers, whereby the motion of either of said levers due to accumulation of paper on one of the rolls will close the stop circuit and stop the machine.

10. In a folder, the combination with a pair of folding rolls, of a lever located adjacent to the outside surface of one roll, said roll being movable, a stop circuit, an open contact in said circuit located on said lever, whereby the motion of said movable roll due to accumulation of paper on either roll will move the lever and close the stop circuit and stop the machine, and yielding means for holding the lever in position for keeping the contact open.

11. In a paper delivering mechanism including rotatable folding cylinders, the combination of means adjacent to the folding cylinders to control the rotation of said cylinders, and means operated by an abnormal thickness of paper on said cylinders to actuate said controlling means to stop the rotation of said cylinders.

12. In a paper delivering mechanism including rotatable folding cylinders, the combination of means between the folding cylinders to control the rotation of said cylinders, and means operated by an abnormal thickness of paper on said cylinders to actuate said controlling means to stop the rotation of said cylinders.

13. In a paper delivering mechanism including rotatable folding rolls, the combination of means adjacent the folding rolls to control the rotation of said rolls, and means operated by an abnormal thickness of paper on said rolls to actuate said controlling means to stop the rotation of said rolls.

HENRY A. WISE WOOD.